(12) United States Patent
Djeu

(10) Patent No.: US 9,516,804 B1
(45) Date of Patent: Dec. 13, 2016

(54) VACUUM SEEDER

(71) Applicant: Derek Djeu, New York, NY (US)

(72) Inventor: Derek Djeu, New York, NY (US)

( * ) Notice: Subject to any disclaimer, the term of this patent is extended or adjusted under 35 U.S.C. 154(b) by 0 days.

(21) Appl. No.: 15/045,038

(22) Filed: Feb. 16, 2016

Related U.S. Application Data

(60) Provisional application No. 62/120,885, filed on Feb. 26, 2015, provisional application No. 62/120,887, filed on Feb. 26, 2015.

(51) Int. Cl.
*A01C 7/04* (2006.01)
*A01C 7/08* (2006.01)
*A01C 7/18* (2006.01)

(52) U.S. Cl.
CPC ............. *A01C 7/044* (2013.01); *A01C 7/046* (2013.01); *A01C 7/081* (2013.01); *A01C 7/082* (2013.01); *A01C 7/18* (2013.01)

(58) Field of Classification Search
CPC .......... A01C 7/042; A01C 7/044; A01C 7/081
See application file for complete search history.

(56) References Cited

U.S. PATENT DOCUMENTS

| | | | |
|---|---|---|---|
| 4,029,235 A | 6/1977 | Grataloup | |
| 4,411,206 A * | 10/1983 | Hiscock | A01C 7/044 111/180 |
| 4,493,272 A * | 1/1985 | Rouhotas, Sr. | A01C 7/044 111/138 |
| 4,718,363 A * | 1/1988 | Williames | A01C 7/044 111/179 |
| 5,351,634 A * | 10/1994 | Patton | A01C 11/00 111/77 |
| 6,142,086 A * | 11/2000 | Richard | A01C 7/044 111/174 |
| 6,516,733 B1 * | 2/2003 | Sauder | A01C 21/005 111/180 |
| 6,520,111 B2 | 2/2003 | Lang | |
| 6,928,941 B1 * | 8/2005 | Sternitzke | A01C 7/042 111/181 |
| 7,174,839 B2 * | 2/2007 | Tsing | A01C 7/044 111/179 |
| 7,191,715 B2 * | 3/2007 | Wendte | A01O 5/068 111/136 |
| 7,490,565 B2 * | 2/2009 | Holly | A01C 7/044 111/174 |
| 9,010,258 B1 * | 4/2015 | Richard | A01C 7/044 111/179 |

* cited by examiner

*Primary Examiner* — Thomas Randazzo
(74) *Attorney, Agent, or Firm* — QuickPatents, LLC; Kevin Prince

(57) ABSTRACT

A vacuum seeder for dispersing seeds at regular intervals into a seeding mechanism includes a pipe having first and second ends, at least one circumferential row of apertures therethrough, the pipe being rotatably mounted to a frame that moves along the ground. A vacuum mechanism is fixed with the second end of the pipe to produce a negative pressure within the pipe. A drive motor is fixed with the frame and coupled with the pipe for driving the pipe in a first rotational direction. A reservoir is fixed with the frame and holds the seeds positioned adjacent an upwardly-moving side of the pipe. At least one seed removal mechanism, such as a seed scraper, is fixed with the frame and positioned adjacent a downward side of the pipe to divert the seeds away from the pipe and into at least one seed receiver for delivery to the seeding mechanism.

11 Claims, 2 Drawing Sheets

US 9,516,804 B1

VACUUM SEEDER

CROSS-REFERENCE TO RELATED APPLICATIONS

This application claims the benefit of U.S. Provisional Patent Application 62/120,885, filed on Feb. 26, 2015, and U.S. Provisional Application 62/120,887, filed on Feb. 26, 2015, both incorporated herein by reference.

STATEMENT REGARDING FEDERALLY SPONSORED RESEARCH AND DEVELOPMENT

Not Applicable.

FIELD OF THE INVENTION

This invention relates to farming, and more particularly to a vacuum seeder.

DISCUSSION OF RELATED ART

Precision seeding is important in large scale farming. Today vacuum seeders offer the most precise seed placement. With these prior art systems, a vacuum pressure picks up a seed and then drops it at a precise interval. The prior-art systems are limited, however.

There is a need for a device that provides gentler removal of the seed from the vacuum seeder, and that allows for fine tuning of the negative vacuum pressure so that a variety of seeds can be carefully picked-up out of a reservoir and gently dropped into a seeding mechanism. Such a needed invention would be relatively easy and inexpensive to manufacture and deploy. The present invention accomplishes these objectives.

SUMMARY OF THE INVENTION

The present device is a vacuum seeder for dispersing seeds at regular intervals into a seeding mechanism, such as at least one tube or conveyor that conveys the seeds from the vacuum seeder to a ground surface for planting.

An elongated, cylindrical pipe is rotatably mounted to a frame with at least a pair of rotational bearings at a first end and a second end of the pipe. The pipe includes an inside surface, an outside surface, and at least one circumferential row of apertures traversing the pipe from the inside surface to the outside surface thereof. The frame may be a rigid structure that is adapted for moving along the ground surface either under its own drive mechanism, or pulled by a vehicle such as a tractor.

A vacuum mechanism is fixed with the second end of the pipe and the frame and is adapted for producing a negative pressure within the pipe. Preferably the first end of the pipe includes an air flow regulator, such as a slidable or rotatable cover, to allow a selected amount of air into the pipe in addition to air entering the pipe from each aperture. As such, the negative pressure within the pipe may be regulated.

A drive mechanism, such as a motor, is fixed with the frame and coupled with the pipe for driving the pipe in a first rotational direction. A reservoir is fixed with the frame and holds the seeds positioned adjacent a side of the pipe that travels upward with respect to the reservoir when the drive mechanism drives the pipe in the first direction.

At least one seed removal mechanism is fixed with the frame and positioned adjacent a downward side of the pipe. Such a seed removal mechanism may be a scraper fixed against or proximate to the downward side of the pipe at each row of apertures, such that the seeds fixed against the pipe are diverted away from the pipe and into at least one seed receiver upon contacting the scraper. Alternately, or additionally, the at least one seed removal mechanism may include a U-shaped channel internal to the pipe that is at nearly ambient pressure, such that once each aperture crosses over the channel inside the pipe, the aperture is no longer subject to the negative pressure and the seed is thereby released.

The at least one seed receiver may take the form of a funnel, and is fixed with the frame and positioned proximate the at least one seed removal mechanism, the at least one seed receiver adapted for delivering seeds to the seeding mechanism.

In operation with the vacuum mechanism producing the negative pressure within the pipe, the pipe being driven by the drive mechanism to rotate in the first direction, and with the reservoir filled with the seeds, a seed is pulled up against the pipe at each aperture that travels past the reservoir by the negative pressure and is retained on the pipe as the pipe rotates the seed over the top thereof and down to the seed removal mechanism. The seed is then removed from the pipe and into the at least one seed receiver to be delivered to the seeding mechanism.

The present invention is a device that provides relatively gentle removal of the seed from the vacuum seeder, and that allows for fine tuning of the negative vacuum pressure so that a variety of different seeds can be carefully picked-up out of a reservoir and gently dropped into a seeding mechanism. The present device is relatively easy and inexpensive to manufacture and deploy. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
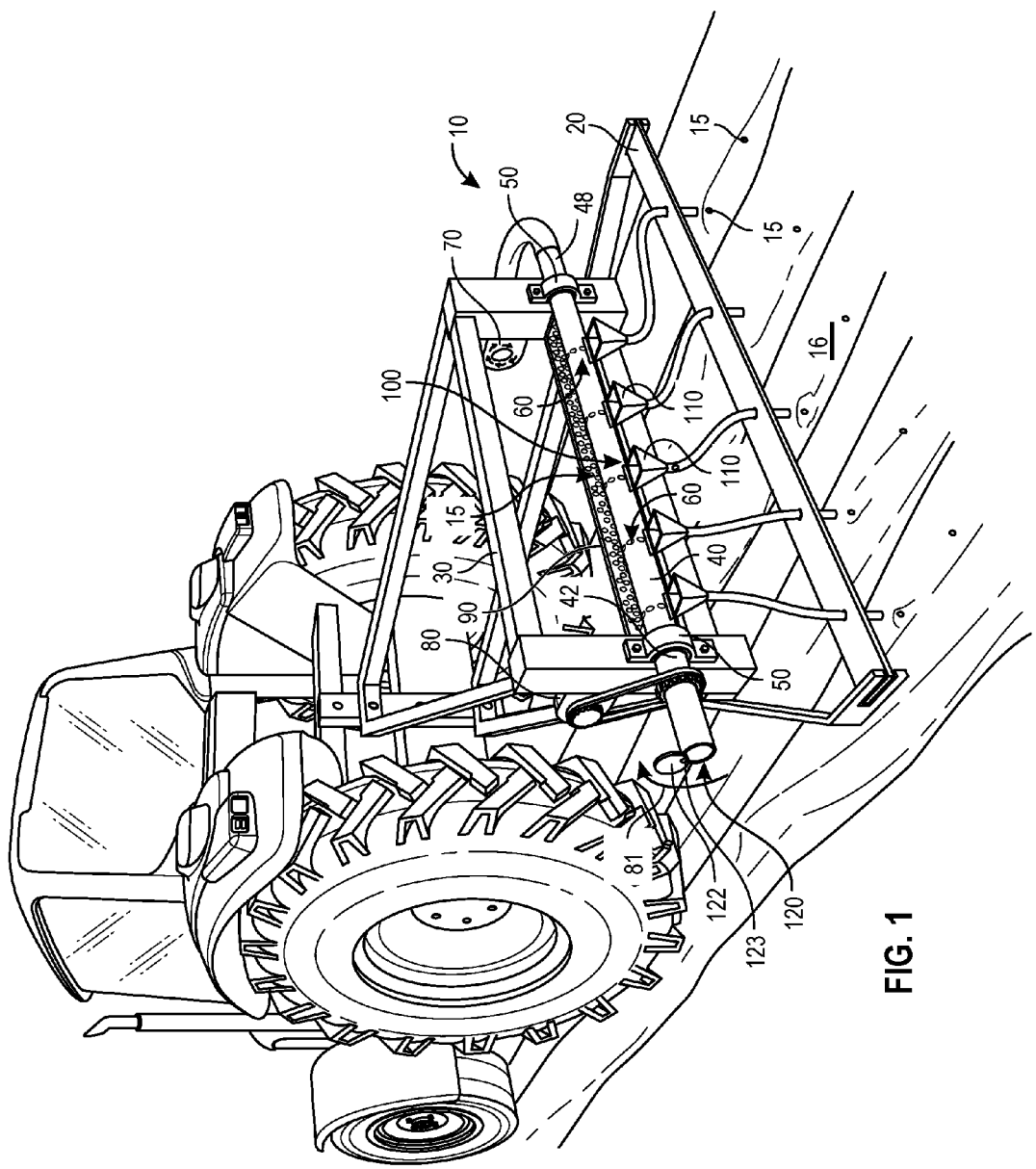
FIG. 1 is a rear perspective view of the invention, illustrated as mounted to a tractor driving along a ground surface to be planted with seeds.
Figure 3:
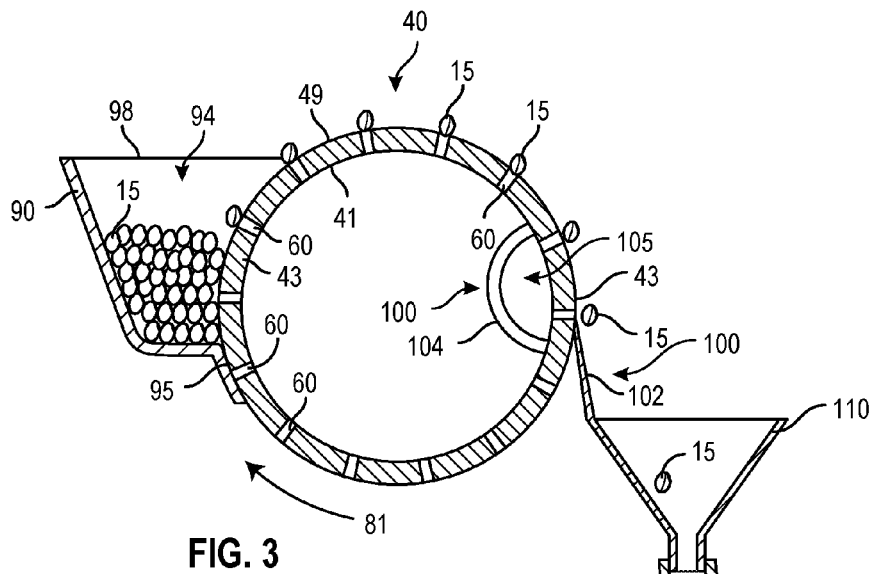
FIG. 3 is a cross-sectional diagram of the invention, taken generally along lines 3-3 of FIG. 2.
Figure 2:
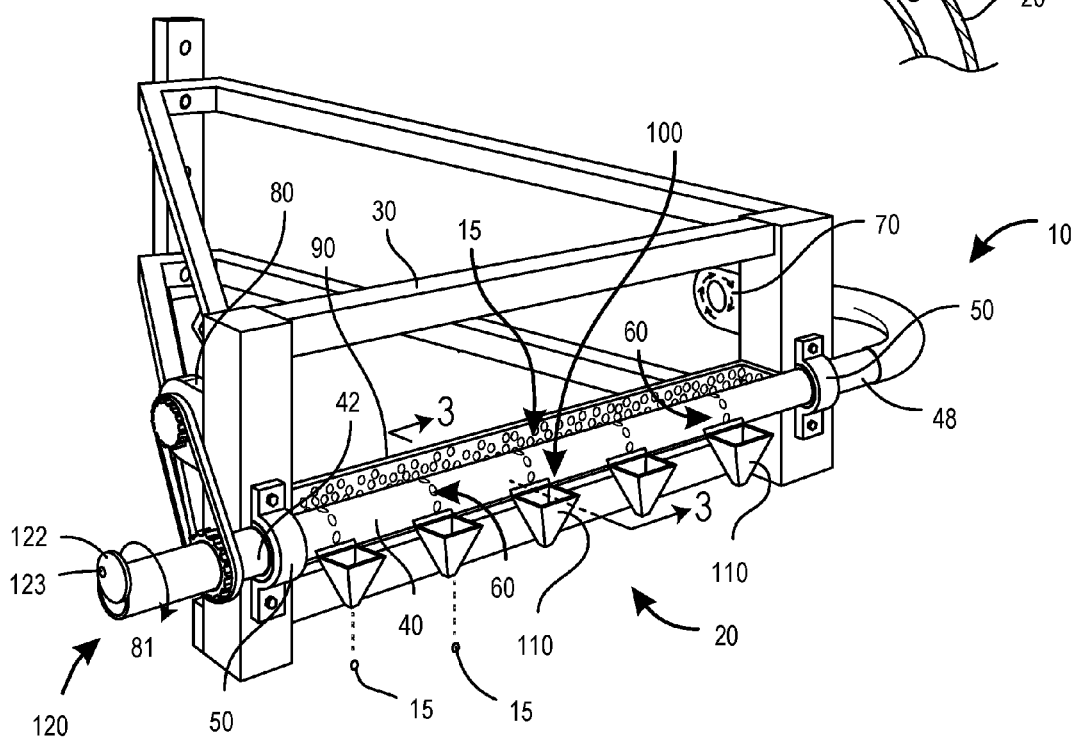
FIG. 2 is an enlarged rear perspective view of another embodiment of the invention.

FIGS. 1-3 illustrate a vacuum seeder 10 for dispersing seeds 15 at regular intervals into a seeding mechanism 20, such as tubes 20 (FIG. 1), conveyors (not shown) that convey the seeds 15 from the vacuum seeder 10 to a ground surface 16, or just a suspension frame 30 (FIG. 2) that suspends the vacuum seeder 10 over the ground surface 16 and allows the seeds 15 to fall at regular intervals directly to the ground surface 16. The seeds 15 may be any suitable seed for planting, fertilizer pellets, or any granular item for delivery to a ground surface or to another machine.

An elongated, cylindrical pipe 40 is rotatably mounted to a frame 30 with at least a pair of rotational bearings 50 at a first end 42 and a second end 48 of the pipe 40. The pipe 40 includes an inside surface 41, an outside surface 49, and at least one circumferential row of apertures 60 traversing the pipe 40 from the inside surface 41 to the outside surface 49 thereof. Each aperture 60 is small than one of the seeds 15. Preferably the pipe 40 is a rigid steel or other metallic pipe 40.

The frame 30 may be a rigid structure that is adapted for moving along the ground surface 16 either under its own drive mechanism (not shown), or pulled by a vehicle such as a tractor. Preferably the frame 30 is a framework of rigid metal frame members.

A vacuum mechanism 70 is fixed with the second end 48 of the pipe 40 and the frame 30. The vacuum mechanism 70 is adapted for producing a negative pressure within the pipe 40 as compared with ambient pressure outside of the pipe 40. Preferably the first end 42 of the pipe 40 includes an air flow regulator 120 to allow air into the pipe 40 in addition to air entering the pipe 40 from each aperture 60. As such, the negative pressure within the pipe 40 may be regulated thereby. Such an air flow regulator 120 may be a cover 122 fixed partially over the open, first end 42 of the pipe 40. The cover 122 is pivotable around a pivot 123 to cover between zero and one-hundred percent of the open first end 42, such that the amount of air allowed into the open first end 42 of the pipe 40 is adjustable by adjusting the pivot angle of the cover 122 with respect to the pipe 40.

A drive mechanism 80 is fixed with the frame 30 and coupled with the pipe 40 for driving the pipe 40 in a first rotational direction 81. Such a drive mechanism 80 may be a variable-speed drive motor 80, such that the delivery speed of the seeds 15 into the seeding mechanism 20 can be regulated by adjusting the speed of the drive motor 80, preferably as related to the speed of the seeding mechanism 20 along the ground surface 16 such as measured by a speedometer (not shown) of the seeding machine, for example. Alternately, the drive mechanism 80 may be a gear and chain arrangement that rotates with one or more wheels of the frame 30 (not shown), or the like.

A reservoir 90 is fixed with the frame 30 and holds the seeds 15 positioned adjacent an upward side 43 of the pipe 40. The reservoir 90 has at least one opening 94 on a side 95 and top 98 of the reservoir 90 adjacent the pipe 40 such that the pipe 40 blocks the at least one opening 94 at the side 95 of the reservoir 90. The upward side 43 of the pipe 40 is the side that travels upward with respect to the reservoir 90 when the drive mechanism 80 drives the pipe 40 in the first direction 81.

At least one seed removal mechanism 100 is fixed with the frame 30 and positioned adjacent a downward side 47 of the pipe 40, the downward side 47 of the pipe 40 opposing the upward side 43 of the pipe 40. Such a seed removal mechanism 100 may be a scraper 102 fixed against or proximate to the downward side 47 of the pipe 40 at each row of apertures 60, such that the seeds 15 fixed against the pipe 40 are diverted away from the pipe 40 and into at least one seed receiver 110 upon contacting the scraper 102.

Alternately, or additionally, the at least one seed removal mechanism may include a U-shaped channel 104 internal to the pipe 40. An open top side 105 of the U-shaped channel 104 is positioned against the downward side 47 of the inside surface 41 of the pipe 40, and the channel 104 is not in direct fluid communication with the vacuum mechanism 70, but rather in fluid communication with the ambient pressure outside of the pipe 40. As such, the pressure within the channel is nearly ambient pressure, such that once each aperture 60 crosses over the channel 104 inside the pipe 40, the aperture is no longer subject to the negative pressure and the seed 15 is thereby released.

The at least one seed receiver 110 may take the form of a funnel, and is fixed with the frame 30 and positioned proximate the at least one seed removal mechanism 100, the at least one seed receiver 110 adapted for delivering seeds to the seeding mechanism 20. The seeding mechanism 20 may be pipes or tubes 20 that dispense the seeds 15 at a predetermined spacing (FIG. 1), or simply the frame 30 suspended above the ground surface 16 and that allows the seeds 15 to drop onto the ground surface 16 directly when removed from the pipe 40 by the seed removal mechanism 100 (FIG. 2).

In operation with the vacuum mechanism 70 producing the negative pressure within the pipe 40, the pipe 40 being driven by the drive mechanism 80 to rotate in the first direction 81, and with the reservoir 90 filled with the seeds 15, a seed is pulled up against the pipe 40 at each aperture 60 that travels past the reservoir 90 by the negative pressure and is retained on the pipe 40 as the pipe 40 rotates the seed 15 over the top thereof and down to the seed removal mechanism 100. The seed 15 is then removed from the pipe 40 and into the at least one seed receiver 110 to be delivered to the seeding mechanism 20.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode comtemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A vacuum seeder for dispensing seeds at regular intervals into a seeding mechanism, comprising:
    an elongated, cylindrical pipe rotatably mounted to a frame with at least a pair of rotational bearings at first and second ends of the pipe, the pipe including an inside surface, an outside surface, and at least one circumferential row of apertures traversing the pipe from the inside surface to the outside surface thereof, each aperture being smaller than one of the seeds;
    a vacuum mechanism fixed with the second end of the pipe and the frame, the vacuum mechanism adapted for producing a negative pressure within the pipe when compared with ambient pressure;
    a drive mechanism fixed with the frame and coupled with the pipe for driving the pipe in a first direction, the drive being is a variable-speed drive motor;
    a reservoir fixed with the frame for holding the seeds and positioned adjacent an upward side of the pipe, the reservoir having at least one opening on a side and top of the reservoir adjacent the pipe such that the pipe blocks the at least one opening at the side of the reservoir, the upward side of the pipe being the side that travels upward with respect to the reservoir when the drive mechanism drives the pipe in the first direction;
    at least one seed removal mechanism fixed with the frame and positioned adjacent on an opposing, downward side of the pipe; and
    at least one seed receiver fixed with the frame and positioned proximate the at least one seed removal mechanism, the at least one seed receiver adapted for delivering seeds to the seeding mechanism;
    whereby with the vacuum mechanism producing the negative pressure within the pipe, the pipe driven by the drive mechanism to rotate, and the reservoir filled with the seeds, a seed is pulled up against the pipe at each aperture by the negative pressure and retained on the pipe as the pipe rotates the seed over the top thereof and down to the seed removal mechanism whereby the seed drops off of the pipe and into the at least one seed receiver to be delivered to the seeding mechanism, and whereby the delivery speed of the seeds into the seeding mechanism can be regulated by adjusting the speed of the drive motor.

2. The vacuum seeder of claim 1 wherein the drive motor speed is related to a speed of the seeding mechanism along a ground surface, as measured by a speedometer of the frame.

3. The vacuum seeder of claim 1 wherein the at least one seed removal mechanism is a scraper fixed against the downward side of the pipe at each row of apertures, whereby seeds fixed against the pipe are diverted away from the pipe and into the at least one seed receiver upon contacting the scraper.

4. The vacuum seeder of claim 1 wherein the first end of the pipe includes an air flow regulator to allow air into the pipe in addition to air entering the pipe from the at least one circumferential row of apertures, whereby the negative pressure within the pipe may be regulated thereby.

5. The vacuum seeder of claim 4 wherein the air flow regulator is a cover fixed partially over the open, first end of the pipe, the cover pivotable around a pivot to cover between zero and one-hundred percent of the open first end, whereby the amount of air allowed into the open first end of the pipe is adjustable by adjusting the cover.

6. A vacuum seeder for dispensing seeds at regular intervals into a seeding mechanism, comprising:
    an elongated, cylindrical pipe rotatably mounted to a frame with at least a pair of rotational bearings at first and second ends of the pipe, the pipe including an inside surface, an outside surface, and at least one circumferential row of apertures traversing the pipe from the inside surface to the outside surface thereof, each aperture being smaller than one of the seeds;
    a vacuum mechanism fixed with the second end of the pipe and the frame, the vacuum mechanism adapted for producing a negative pressure within the pipe when compared with ambient pressure;
    a drive mechanism fixed with the frame and coupled with the pipe for driving the pipe in a first direction;
    a reservoir fixed with the frame for holding the seeds and positioned adjacent an upward side of the pipe, the reservoir having at least one opening on a side and top of the reservoir adjacent the pipe such that the pipe blocks the at least one opening at the side of the reservoir, the upward side of the pipe being the side that travels upward with respect to the reservoir when the drive mechanism drives the pipe in the first direction;
    at least one seed removal mechanism fixed with the frame and positioned adjacent on an opposing, downward side of the pipe, the at least one seed removal mechanism including a U-shaped channel internal to the pipe, an open top side of the U-shaped channel positioned against the downward side of the inside surface, the channel not in direct fluid communication with the vacuum mechanism, whereby the pressure within the channel is nearly ambient pressure, such that once each aperture crosses over the channel inside the pipe, the aperture no longer is subject to the vacuum and the seed is thereby released; and at least one seed receiver fixed with the frame and positioned proximate the at least one seed removal mechanism, the at least one seed receiver adapted for delivering seeds to the seeding mechanism;

whereby with the vacuum mechanism producing the negative pressure within the pipe, the pipe driven by the drive mechanism to rotate, and the reservoir filled with the seeds, a seed is pulled up against the pipe at each aperture by the negative pressure and retained on the pipe as the pipe rotates the seed over the top thereof and down to the seed removal mechanism whereby the seed drops off of the pipe and into the at least one seed receiver to be delivered to the seeding mechanism.

7. The vacuum seeder of claim 6 wherein the first end of the pipe includes an air flow regulator to allow air into the pipe in addition to air entering the pipe from the at least one circumferential row of apertures, whereby the negative pressure within the pipe may be regulated thereby.

8. The vacuum seeder of claim 7 wherein the air flow regulator is a cover fixed partially over the open, first end of the pipe, the cover pivotable around a pivot to cover between zero and one-hundred percent of the open first end, whereby the amount of air allowed into the open first end of the pipe is adjustable by adjusting the cover.

9. A vacuum seeder for dispensing seeds at regular intervals into a seeding mechanism, comprising:

an elongated, cylindrical pipe rotatably mounted to a frame with at least a pair of rotational bearings at first and second ends of the pipe, the pipe including an inside surface, an outside surface, and at least one circumferential row of apertures traversing the pipe from the inside surface to the outside surface thereof, each aperture being smaller than one of the seeds;

a vacuum mechanism fixed with the second end of the pipe and the frame, the vacuum mechanism adapted for producing a negative pressure within the pipe when compared with ambient pressure;

a drive mechanism fixed with the frame and coupled with the pipe for driving the pipe in a first direction;

a reservoir fixed with the frame for holding the seeds and positioned adjacent an upward side of the pipe, the reservoir having at least one opening on a side and top of the reservoir adjacent the pipe such that the pipe blocks the at least one opening at the side of the reservoir, the upward side of the pipe being the side that travels upward with respect to the reservoir when the drive mechanism drives the pipe in the first direction;

at least one seed removal mechanism fixed with the frame and positioned adjacent on an opposing, downward side of the pipe, the at least one seed removal mechanism including a scraper fixed against the downward side of the pipe at each row of apertures;

the at least one seed removal mechanism further including a U-shaped channel internal to the pipe, an open top side of the U-shaped channel positioned against the downward side of the inside surface, the channel not in direct fluid communication with the vacuum mechanism, whereby the pressure within the channel is nearly ambient pressure, such that once each aperture crosses over the channel inside the pipe, the aperture no longer is subject to the vacuum and the seed is thereby released, the scraper providing redundant seed removal from the pipe if the seed refuses to drop after the aperture returns to ambient pressure; and at least one seed receiver fixed with the frame and positioned proximate the at least one seed removal mechanism, the at least one seed receiver adapted for delivering seeds to the seeding mechanism;

whereby with the vacuum mechanism producing the negative pressure within the pipe, the pipe driven by the drive mechanism to rotate, and the reservoir filled with the seeds, a seed is pulled up against the pipe at each aperture by the negative pressure and retained on the pipe as the pipe rotates the seed over the top thereof and down to the seed removal mechanism whereby the seed drops off of the pipe and into the at least one seed receiver to be delivered to the seeding mechanism, and whereby seeds fixed against the pipe are diverted away from the pipe and into the at least one seed receiver upon contacting the scraper.

10. The vacuum seeder of claim 9 wherein the first end of the pipe includes an air flow regulator to allow air into the pipe in addition to air entering the pipe from the at least one circumferential row of apertures, whereby the negative pressure within the pipe may be regulated thereby.

11. The vacuum seeder of claim 10 wherein the air flow regulator is a cover fixed partially over the open, first end of the pipe, the cover pivotable around a pivot to cover between zero and one-hundred percent of the open first end, whereby the amount of air allowed into the open first end of the pipe is adjustable by adjusting the cover.

* * * * *